United States Patent Office 2,895,977
Patented July 21, 1959

2,895,977

PROCESS FOR ALKYLTRIFLUOROSILANES

Frederick T. Fitch, Baltimore, Md., assignor to W. R. Grace & Co., New York, N.Y., a corporation of Connecticut No Drawing. Application March 18, 1958
Serial No. 722,144

6 Claims. (Cl. 260—448.2)

This invention relates to the preparation of organic silicon compounds, more particularly to a new process for making alkyltrifluorosilanes.

Alkyltrifluorosilanes can be prepared by halide exchange reactions from the corresponding alkyltrichlorosilanes. A different approach, the alkylation of silicon tetrafluoride, has been studied using some of the classical methods of organic chemistry. The Wurtz reaction $RX + SiF_4 + 2Na \rightarrow RSiF_3 + NaX + NaF$ has never proved to be entirely satisfactory. A new related approach using sodium or lithium alkyls $RM + SiF_4 \rightarrow RSiF_3 + MF$ appears to be more promising. By far, the best and most widely used laboratory alkylation is the Grignard method $RMgX + SiF_4 \rightarrow RSiF_3 + MgXF$. The afore-mentioned reactions are primarily laboratory methods convenient for the synthesis of limited amounts of material and have not been adapted to large scale manufacturing processes for economic as well as other reasons.

Recent commercial developments in the silane field have followed two alkylation approaches. The first is the high temperature reaction of alkyl halides with copper-activated silicon (Rochow) and the second is the metal-catalyzed reactions of alkyl halides with silicon halides (Hurd). Both processes are normally operated at temperatures well above 300° C. and give mixtures of all possible alkylhalosilanes. For example, methyl chloride gives monomethyltrichlorosilane, dimethyldichlorosilane, trimethylmonochlorosilane and small amounts of tetramethylsilane. The analogous mixed alkyl silicon fluorides can be prepared by the reaction of alkyl aluminum chloride and silicon tetrafluoride, H. C. Brown, U.S. Patent 2,762,824.

It has now been discovered that alkyltrifluorosilanes can be prepared in high yield free from further alkylated silanes by the reaction of the corresponding volatile alkyl alumnium halide with an alkali metal fluosilicate salt. The alkyl aluminum halides are readily prepared, as is well known, by the action of alkyl halides on aluminum $4Al + 6RX \rightarrow 2R_3Al_2X_3$. Alkali metal fluosilicates are inexpensive commercially available starting materials.

It is an object of this invention to provide an improved process for the preparation of alkyltrifluorosilanes. Another object is to provide a method for manufacturing products of the above type from relatively inexpensive starting materials. It is a further object of this novel process to obtain almost exclusively and in relatively high yield alkyltrifluorosilanes free from higher alkylated silanes. In addition to the obvious economic advantage, the need for extensive fractionation and further purification will be minimized. Other objects and advantages of this invention will become apparent as the description proceeds.

Alkyl halides (RX) react with aluminum to give equimolar mixtures of $RAlX_2$ and $R_2AlX$. For convenience, the product may be considered to be $R_3Al_2X_3$. Such a formula is in accord with the well known tendency of certain aluminum compounds to exist as dimers. Aluminum chloride, for example, is written as $Al_2Cl_6$ by many workers in the field because it actually exists as such under the usual conditions in which it is encountered. Suffice it to say that for the purposes of this invention equimolar mixtures of $RAlX_2$ and $R_2AlX$, $R_3Al_2X_3$, and alkyl aluminum halide are equivalent methods of expressing the same chemical entity. The reaction between alkyl halides and aluminum, once initiated, is strongly exothermic. Some form of "activated" aluminum is required to start the reaction and the presence of a catalyst such as bichloride of mercury has been found to be helpful in promoting a smooth reaction. The ever-present protective coatings found on aluminum are the main obstacle to starting the reaction. Consequently, there exist several divergent opinions as to the conditions essential to initiate the reaction and to maintain it satisfactorily. The system has been variously stated to require prolonged induction periods, pressure, physical surface-cleaning under inert atmospheres, and catalysts such as aluminum chloride, halogens or reaction residues. It was found here to be convenient to clean and activate the aluminum in situ and then pass the alkyl halide through the aluminum bed. The reaction maintained itself at about 120–140° C. and excellent conversion of the aluminum was achieved. Since the alkyl aluminum halides are spontaneously flammable in air or react violently with moisture, special care must be exercised in handling these compounds. They are best contained in metal or glass under an inert atmosphere and dispensed under nitrogen pressure when required. While the reaction of aluminum with alkyl halides is general, only those lower alkyl aluminum halides capable of vaporization can be used in the practice of this invention. By capable of vaporization, it is meant that the compound can exist in the vapor state at 200–300° C. when carried by means of an inert gas through a heated tube packed with reactant. Specific alkyl halides whose corresponding aluminum compound is suitable for the practice of this invention are methyl, ethyl, isopropyl, propyl, sec-butyl, isobutyl and butyl. For reasons of economy and increased volatility, chloride is the halide of choice.

The present invention, the reaction of lower alkyl aluminum halides with alkali metal fluosilicates, is best accomplished by passing the vaporized aluminum compound over a bed of the heated fluosilicate salt present in excess. While this approach gives monoalkylation exclusively, there is no theoretical reason why other systems could not be devised to give further alkylated compounds. In fact, it has been found that reaction in confined systems tends strongly toward tetrasubstitution.

In the usual practice of this invention, previously prepared alkyl aluminum halide is vaporized at a convenient rate in a stream of dry, inert gas (usually nitrogen). The vapor stream is passed over the alkali metal fluosilicate heated at from about 200–300° C. Proper support of the fluosilicate is important because it becomes coated and unreactive as the reaction progresses. While some degree of reaction occurs at temperatures below 200° C., a satisfactory rate of conversion is not achieved until that temperature is reached. While the product itself is stable at room temperatures over 300° C., decomposition of the reactants will become serious enough to materially decrease the yield at temperatures much above 300° C. The exit gases are condensed in a series of cold traps and the resultant liquid fractionated in the usual manner.

Mole ratios of reactants are meaningless in flow systems of this type where one of the reactants is present in excess. What is desired is a high specific conversion of the alkyl groups. It is interesting to note that although most of the halide from the organic aluminum compound appears as the alkali metal salt, a small degree of halide exchange or substitution occurs. While no dialkylsilanes are isolated, small amounts of alkylchlorodifluorosilanes and alkyldichlorofluorosilanes are obtained. When made for preparing water repellant films, as chemical intermediates, for cross-linking siloxane polymers, etc., the presence of some chloro substituent will not materially affect the properties of the alkyltrifluorosilane. If necessary, the compound can be readily purified.

The following example is given by way of illustration and is not intended to delimit the scope of this invention.

*Example 1*

Seventy grams of sodium fluosilicate was supported on glass wool in a 1" x 20" tube and heated to 200° C. in a stream of nitrogen. Then at the rate of 0.5 ml. of liquid per minute and in the presence of dry nitrogen as the carrier gas, aluminum methyl chloride vapor was passed through the fluosilicate bed. The exit gases were collected in a series of Dry Ice-acetone traps kept at −75° C. A 13 g. portion of the substituted silane product was separated by distillation giving 0.072 mole boiling −32 to −31° C., 0.015 mole boiling −5 to 0° C. and a small still residue boiling at or slightly above room temperature. Further distillation and analysis (infra-red and silicon, fluorine and chlorine) gave the following:

| Compound | Boiling point, °C. | Yield, parts |
|---|---|---|
| $CH_3SiF_3$ | −30.2 | 8 |
| $CH_3SiClF_2$ | −0.5 | 2 |
| $CH_3SiCl_2F$ | 29.5 | 1 |

I claim:

1. A process for preparing loweralkyltrihalosilanes which comprises passing alkyl aluminum halide vapors through excess alkali metal fluosilicate at 200 to 300° C.

2. A process for preparing loweralkyltrifluorosilanes which comprises passing alkyl aluminum halide vapors through an excess of an alkali metal fluosilicate at 200 to 300° C. and recovering the resultant loweralkyltrifluorosilane from the reaction mixture.

3. A process according to claim 2 wherein the alkyl aluminum halide is methyl aluminum chloride.

4. A process for preparing methyltrihalosilanes which comprises passing methyl aluminum chloride vapors through excess sodium fluosilicate at about 200° C.

5. A process for preparing methyltrifluorosilane which comprises passing methyl aluminum chloride vapors through excess sodium fluosilicate at about 200° C. and recovering the resultant methyltrifluorosilane from the reaction mixture.

6. A process for preparing mixed methyltrihalosilanes consisting essentially of methyltrifluorosilane, methylchlorodifluorosilane and methyldichlorofluorosilane which comprises passing methyl aluminum chloride vapors through excess sodium fluosilicate at about 200° C.

References Cited in the file of this patent

Jenkner: German application Ser. No. K 18,391, printed Feb. 2, 1956 (Kl. 12o2603), 2 p. spec., no dwg.

Jenkner et al.: German application Ser. No. K 26,023, printed Sept. 27, 1956 (Kl. 12o2603), 2 p. spec. no dwg.